United States Patent
Takagi et al.

(10) Patent No.: US 9,036,724 B2
(45) Date of Patent: May 19, 2015

(54) DATA SIGNAL CORRECTION CIRCUIT, RECEIVER, AND DATA SIGNAL CORRECTION METHOD

(71) Applicants: FUJITSU SEMICONDUCTOR LIMITED, Yokohama-shi, Kanagawa (JP); FUJITSU LIMITED, Kawasaki-shi, Kanagawa (JP)

(72) Inventors: Hiroaki Takagi, Akishima (JP); Masataka Umeda, Yokohama (JP); Naoto Adachi, Yokohama (JP)

(73) Assignees: FUJITSU SEMICONDUCTOR LIMITED, Yokohama (JP); FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/179,285

(22) Filed: Feb. 12, 2014

(65) Prior Publication Data

US 2014/0270022 A1 Sep. 18, 2014

(30) Foreign Application Priority Data

Mar. 14, 2013 (JP) .................................. 2013-051909

(51) Int. Cl.
*H04K 1/10* (2006.01)
*H04L 25/02* (2006.01)
*H04L 25/03* (2006.01)

(52) U.S. Cl.
CPC ........ *H04L 25/0212* (2013.01); *H04L 25/0204* (2013.01); *H04L 25/022* (2013.01); *H04L 25/0232* (2013.01); *H04L 25/0236* (2013.01); *H04L 25/03019* (2013.01); *H04L 2025/03636* (2013.01)

(58) Field of Classification Search
CPC ................. H04L 2025/03414; H04L 27/2647; H04L 25/022; H04L 25/0212; H04L 25/0204; H04L 25/025; H04L 25/0202; H04L 5/0007; H04L 25/03987; H04L 27/01; H04L 25/0236; H04L 25/03019; H04L 25/0232; H04L 2025/03636
USPC .......................... 375/259, 229, 260, 267, 316
See application file for complete search history.

(56) References Cited

U.S. PATENT DOCUMENTS

2010/0172396 A1* 7/2010 Cairns et al. ................... 375/148
2010/0329313 A1* 12/2010 Lachover et al. ............. 375/150

FOREIGN PATENT DOCUMENTS

JP 2005-045664 A 2/2005
JP 2005-260331 A 9/2005

* cited by examiner

*Primary Examiner* — Dhaval Patel
(74) *Attorney, Agent, or Firm* — Arent Fox LLP

(57) ABSTRACT

A data signal correction circuit includes a channel characteristic calculator unit configured to calculate a channel characteristic estimate value of a received data signal on the basis of a pilot signal, a path detector unit configured to determine a delay quantity of multipath propagation of the received data signal on the basis of the calculated channel characteristic estimate value, and an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval.

18 Claims, 14 Drawing Sheets

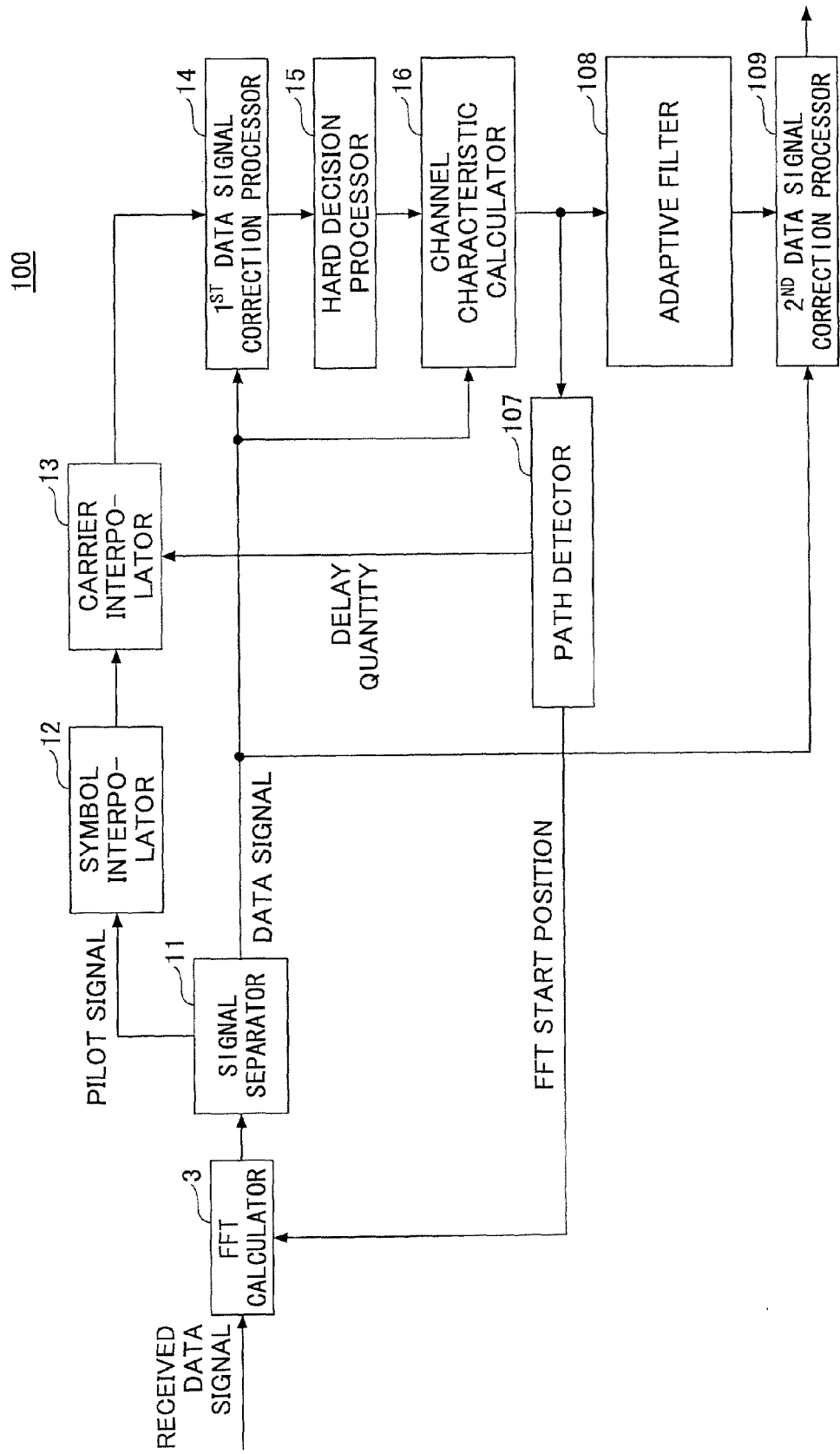

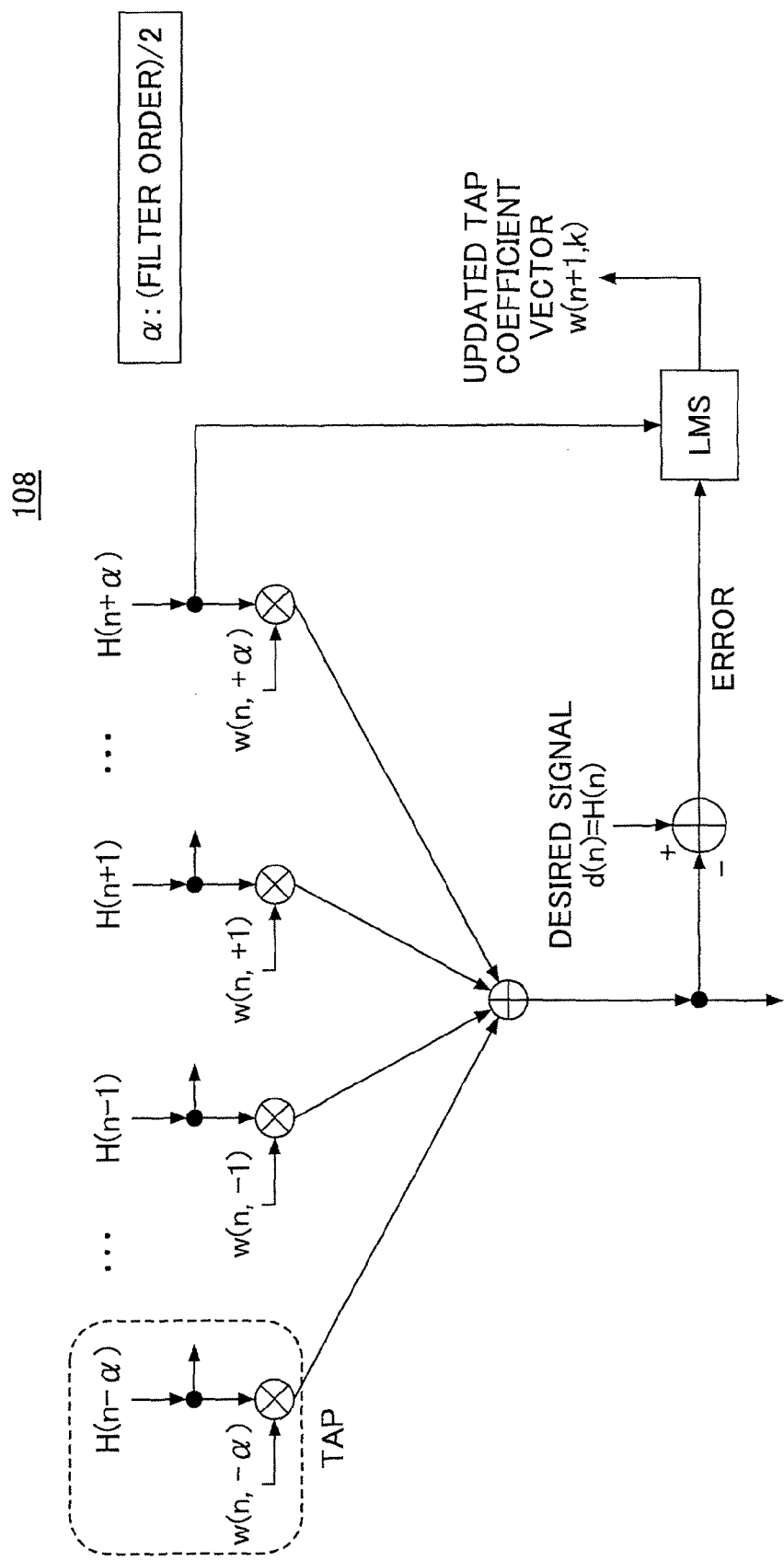

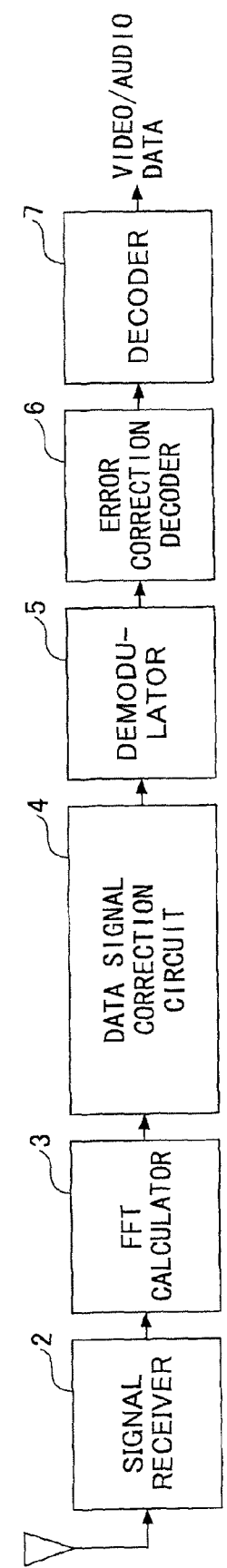

FIG.9

| DELAY QUANTITY δ | DATA INPUT INTERVAL K | LPF CUTOFF BAND |
|---|---|---|
| Symbol/2 ≤ δ | 1 (conventional) | LPF not required |
| Symbol/3 ≤ δ < Symbol/2 | 2 | Symbol/2 |
| Symbol/4 ≤ δ < Symbol/3 | 3 | Symbol/3 |
| Symbol/5 ≤ δ < Symbol/4 | 4 | Symbol/4 |
| .. | .. | .. |

39

DATA SIGNAL CORRECTION CIRCUIT, RECEIVER, AND DATA SIGNAL CORRECTION METHOD

CROSS REFERENCE TO RELATED APPLICATIONS

This application claims benefit of priority of Japanese Patent Application No. 2013-051909 filed Mar. 14, 2013, which is incorporated herein by reference in its entirety.

FIELD

Present disclosures relate to a data signal correction circuit, a receiver using the same, and a data signal correction method.

BACKGROUND

An OFDM receiver adapted to receive orthogonal frequency division multiplexing (OFDM) signals estimates a channel state using pilot signals to correctly decode transmitted data signals. In a time-frequency pilot pattern, pilot signals are scattered along the carrier frequency axis (i.e., in the carrier direction) and along the time axis (i.e., in the symbol direction) at constant intervals. Based upon the pilot signals, symbols and carrier frequencies are recovered by interpolation to estimate the channel characteristic. By dividing the received data symbols by the estimated channel characteristic, the data signal is corrected. To improve the signal receiving performance, it is important to improve channel estimation accuracy.

In general, an adaptive filter is used to estimate the channel characteristic for data signals. Adaptive filters are superior to fixed filters because the filter coefficients can be optimized according to the propagation environment.

FIG. 1 is a conventional schematic diagram of a data signal correction circuit using a typical adaptive filter 108. A received signal, which has been subjected to fast Fourier transform at a fast Fourier transform (FFT) calculator unit 3, is separated at a signal separator unit 11 into a pilot signal and a data signal. At a symbol interpolator unit 12, the pilot signal is recovered in the direction of time by interpolating between pilot symbols. Then, at a carrier interpolator unit 13, the symbol-interpolated signal is further recovered in the direction of frequency by interpolating between pilot carriers using a filter with a passband according to the quantity of multipath delay spread, thereby determining a channel characteristic estimate value of the data part.

A first data signal correction processor unit 14 estimates a transmitted data signal by dividing the received data signal by the channel characteristic estimate value. A hard decision processor unit 15 makes hard decision on the estimated transmitted data signal with respect to constellation points. A channel characteristic calculator unit 16 calculates a channel characteristic estimate value by dividing the received data signal by the post-hard-decision transmitted data signal.

A path detector unit 107 calculates a delay profile by performing inverse fast Fourier transform on the post-hard-decision channel characteristic estimate value, and determines a symbol start position of a FTT window. The path detector unit 107 also calculates a multipath delay quantity from the delay profile, and supplies the calculated multipath delay to a carrier interpolator unit 13.

An adaptive filter 108 carries out adaptive equalization on the post-hard-decision channel characteristic estimate value. The filter coefficients are updated by least mean square (LMS) algorithms. A second data signal correction processor unit 109 divides the received data signal by the adaptively equalized channel characteristic estimate value and outputs transmitted data.

FIG. 2 is a schematic diagram illustrating a conventional adaptive filter 108, in which H(n) denotes a channel characteristic estimate value of carrier number "n". Channel characteristic estimate values of carrier numbers $n-\alpha, \ldots, n-1, n+1, \ldots, n+\alpha$ are input to the corresponding taps of the adaptive filter 108 with the filter order of $2*\alpha$. Each of the inputted channel characteristic estimate values is multiplied by a corresponding tap coefficient w(n, k), where w(n, k) denotes the tap coefficient of the carrier number k with respect to carrier number "n". The multiplication results of all the taps are added and output. The difference between the added value and the desired signal $d(n)=H(n)$ is an error, which error is used to calculate updated values of the tap coefficients.

By increasing the number of taps of the adaptive filter 108, the resolution can be increased and channel estimation accuracy can be improved. For example, the filter characteristic with filter order 20 in FIG. 3A can be improved by increasing the filter order to 60 as illustrated in FIG. 3B, in which a steep waveform can be obtained.

However, when increasing the number of taps, the circuit size and electric power consumption also increase. It is desired to improve the filter characteristic without increasing the circuit size.

It has been proposed to selectively perform symbol recovery interpolation according to the multipath delay quantity when time fluctuation of a received signal is great. See, for example, Japanese Laid-open Patent Publication No. 2005-45664.

SUMMARY

In view of the above-described problem, the embodiments provides a data signal correction technique that can improve adaptive filter resolution without increasing the total number of taps and improve channel estimation accuracy.

In one aspect of the embodiments, a data signal correction circuit is provided. The data signal correction circuit includes
a channel characteristic calculator unit configured to calculate a channel characteristic estimate value of a received data signal on the basis of a pilot signal,
a path detector unit configured to determine a delay quantity of multipath propagation of the received data signal on the basis of the calculated channel characteristic estimate value, and
an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval.

With this arrangement, the adaptive filter resolution is improved without increasing the number of taps, and channel estimation accuracy can be improved. Other objects and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1 is a schematic diagram of a conventional data signal correction circuit;

FIG. 2 is a schematic diagram of a typical adaptive filter;

FIG. 4 is a schematic diagram of a receiver to which a data signal correction circuit of an embodiment is applied;

FIG. 9 illustrates an example of a data input interval selection table;

DESCRIPTION OF EMBODIMENTS

Figure 3A:
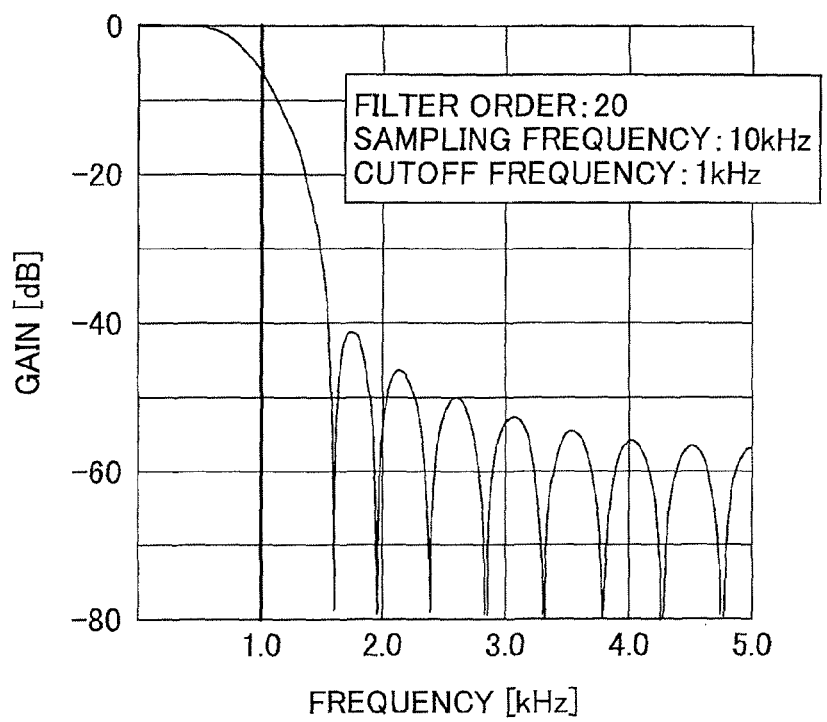
FIG. 3A is a diagram to explain improvement of filter characteristic by increasing the total number of taps.
Figure 3B:
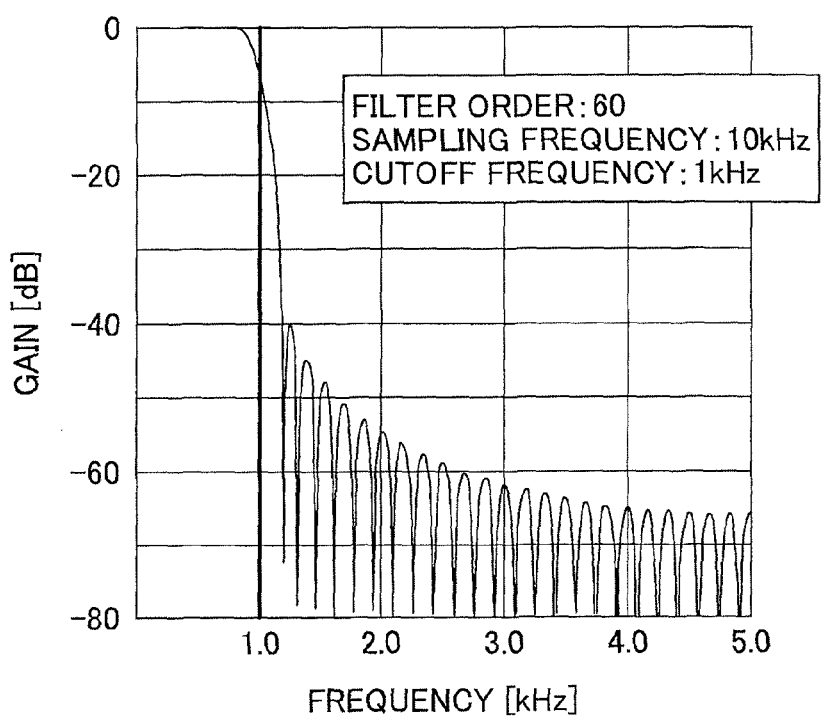
FIG. 3B is a diagram to explain improvement of filter characteristic by increasing the total number of taps.

In the embodiments, data input intervals at an adaptive filter are varied along the carrier frequency axis according to a multipath delay quantity of a received signal. With this arrangement, the filter resolution is improved, while maintaining the number of taps of the adaptive filter. Preferably, the cutoff frequency of a low pass filter inserted after the adaptive filter is adjusted in accordance with the adjusted data input intervals of the adaptive filter.

FIG. 4 illustrates an example of a receiver 1 to which a data signal correction circuit of an embodiment is applied. The receiver 1 is, for example, a terrestrial digital broadcasting receiver. An OFDM signal received at an antenna is down-converted to a baseband signal and subjected to analogue-to-digital conversion at a signal receiver unit 2 of a tuner. The signal receiver unit 2 carries out signal synchronization and determines a fast Fourier transform (FFT) time window.

An FFT calculator unit 3 performs fast Fourier transform on the received signal to transform the time-domain signal to a frequency-domain signal.

A data signal correction circuit 4 performs channel estimation and equalization. Channel estimation is performed using a scattered pilot signal (SP) which is a known signal transmitted together with a data signal. By performing complex division on the received data signal using the channel characteristic estimate value, channel influence is removed and the received data signal is equalized.

A demodulator unit 5 demodulates the equalized signal according to the modulation scheme for the broadcast wave. An error correction decoder unit 6 performs error correction and outputs the error-corrected signal in a transform stream (TS) format. An decoder 7 decodes the TS data signal into a video/audio signal.

Figure 5:
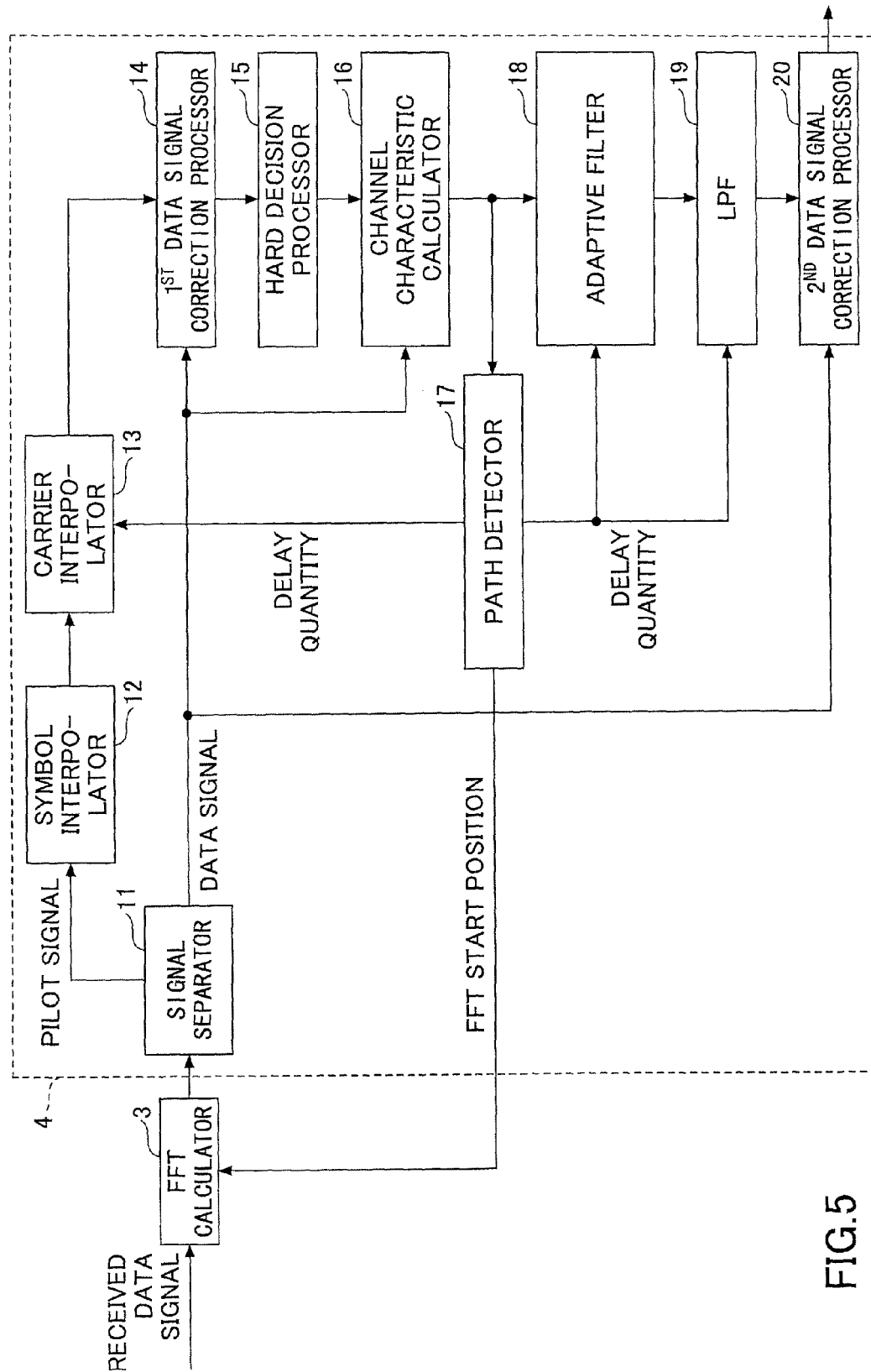
FIG. 5 is a schematic diagram of a data signal correction circuit according to an embodiment.
Figure 6A:
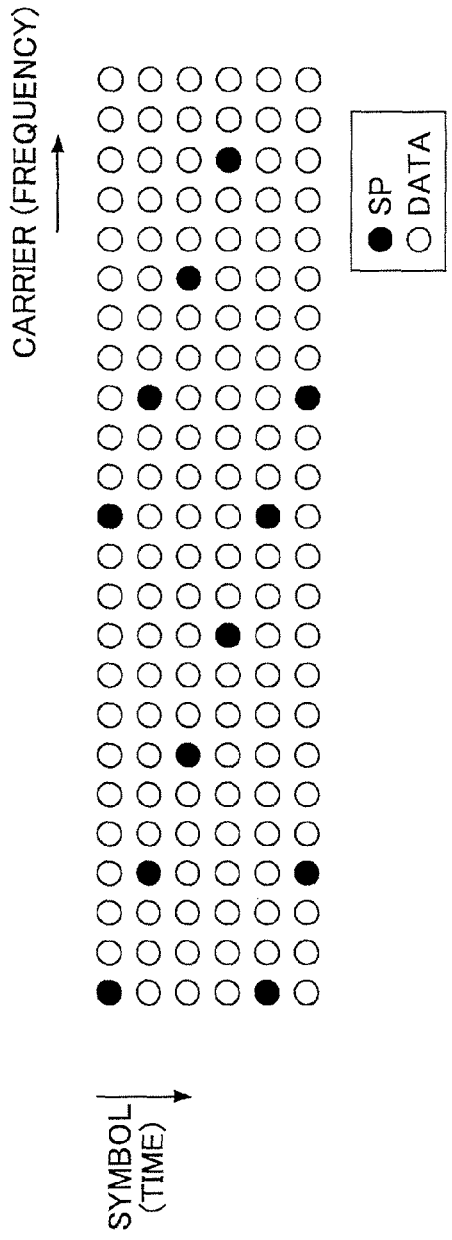
FIG. 6A illustrates a two-dimensional pilot pattern in which pilot signals are scattered in a time-frequency grid.
Figure 6B:
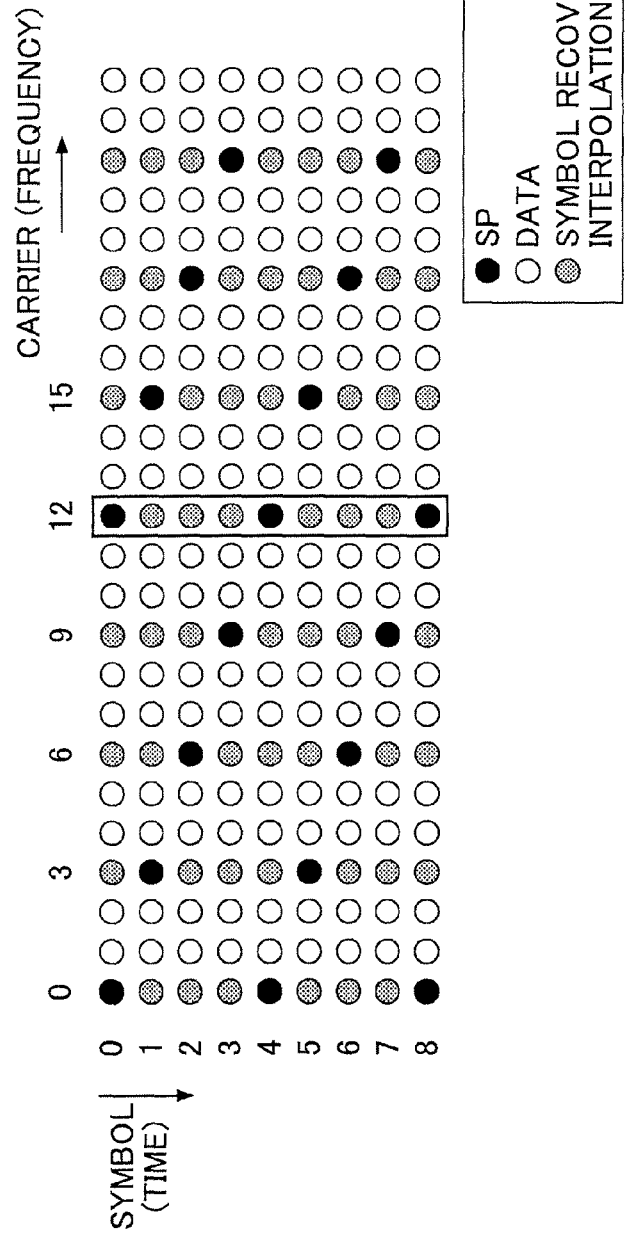
FIG. 6B illustrates symbol recovery interpolation based upon the scattered pilot signals.
Figure 6C:
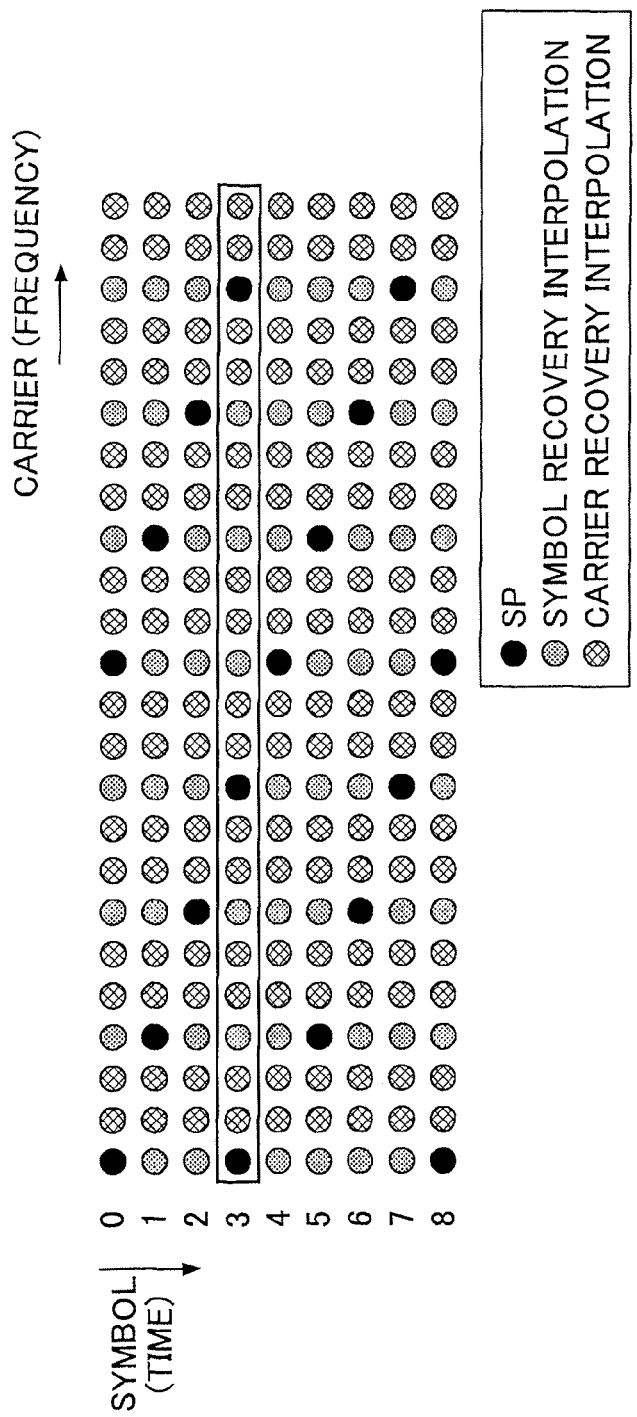
FIG. 6C illustrates carrier recovery interpolation after symbol recovery interpolation.

FIG. 5 is a schematic block diagram of the data signal correction circuit 4 used in the receiver of FIG. 4. The received signal having been subjected to fast Fourier transform at the FFT calculator unit 3 is separated into a pilot signal and a data signal by a signal separator unit 11. As illustrated in FIG. 6A, scattered pilot (SP) symbols are inserted in data symbols to be transmitted in the symbol (or time) direction and the carrier (or the frequency) direction at constant intervals. Because the pilot signal is a known signal, a channel characteristic of data symbols is estimated by interpolation using the separated pilot signal. A symbol interpolator unit 12 inserts pilot symbols in the symbol direction for symbol recovery, as illustrated in FIG. 6B. A carrier interpolator unit 13 performs carrier recovery interpolation on the symbol-interpolated signal, as illustrated in FIG. 6C, using a filter with a frequency band in accordance with a multipath delay quantity and calculates a first channel characteristic estimate value for the data signal.

A first data signal correction processor unit 14 divides the received data signal by the first channel characteristic estimate value to estimate a transmitted data signal. A hard decision processor unit 15 makes hard decision on the estimated transmitted data signal with respect to a constellation. A channel characteristic calculator unit 16 divides the received signal by the hard-decided transmitted data signal to calculate a hard-decided channel characteristic estimate value. The hard-decided channel characteristic estimate value is supplied to the path detector unit 17 and the adaptive filter 18.

The path detector unit 17 performs inverse fast Fourier transform on the hard-decided channel characteristic estimate to produce a delay profile and determines an FTT start position. The path detector unit 17 calculates a delay quantity from the delay profile. The calculated delay quantity is supplied to the carrier interpolator unit 13, the adaptive filter 18 and a low pass filter (LPF) 19.

As a feature of the data signal correction circuit 4 illustrated in FIG. 5, the adaptive filter 18 adjusts or broadens the input interval of the channel characteristic estimate values supplied from the channel characteristic calculator unit 16 along the carrier frequency axis (in the carrier direction), based upon the delay quantity detected by the path detector unit 17. This feature is described in more detail with reference to FIG. 7A and FIG. 7B.

Figure 7A:
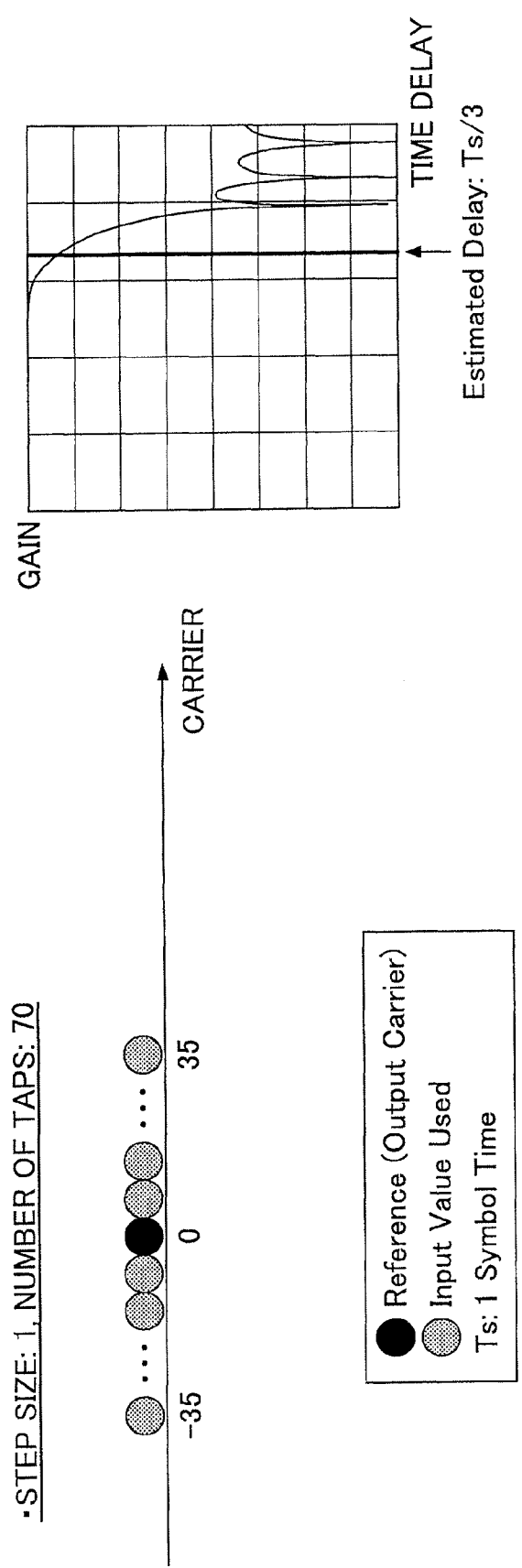
FIG. 7A is a diagram to explain the basic idea of the data signal correction circuit according to an embodiment.
Figure 7B:
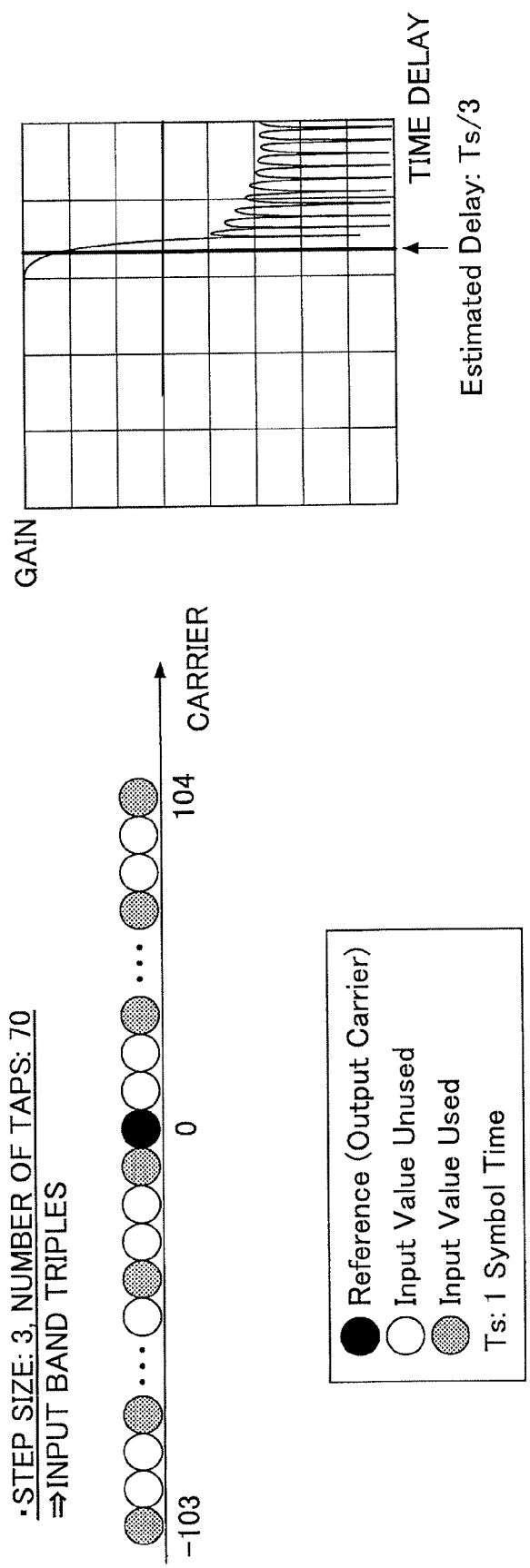
FIG. 7B is a diagram to explain the basic idea of the data signal correction circuit according to an embodiment.

In the examples of FIG. 7A and FIG. 7B, the delay quantity detected by the path detector unit 17 is at or near one third (⅓) of a symbol time. In FIG. 7A, channel characteristic estimate values are successively input in the carrier direction to the adaptive filter 18 having a certain number of taps, as in the conventional way. The step size of this pattern is "1". This arrangement may not achieve a sufficient filter resolution in the multipath environment.

In contrast, in FIG. 7B, when a multipath delay quantity is at or near one third (⅓) of a symbol time, the channel characteristic estimate values are input to the adaptive filter 18 every three carriers. The step size of this pattern is "3". With this arrangement, the input bandwidth triples and the resolution of the adaptive filter 18 becomes three times higher than the conventional filter. Because the same number of carrier information items are filtered from among a broader frequency band, a steep cutoff characteristic can be obtained without increasing the number of taps. The channel characteristic estimation accuracy for the data signal is increased and the signal reception performance is improved.

Figure 8:
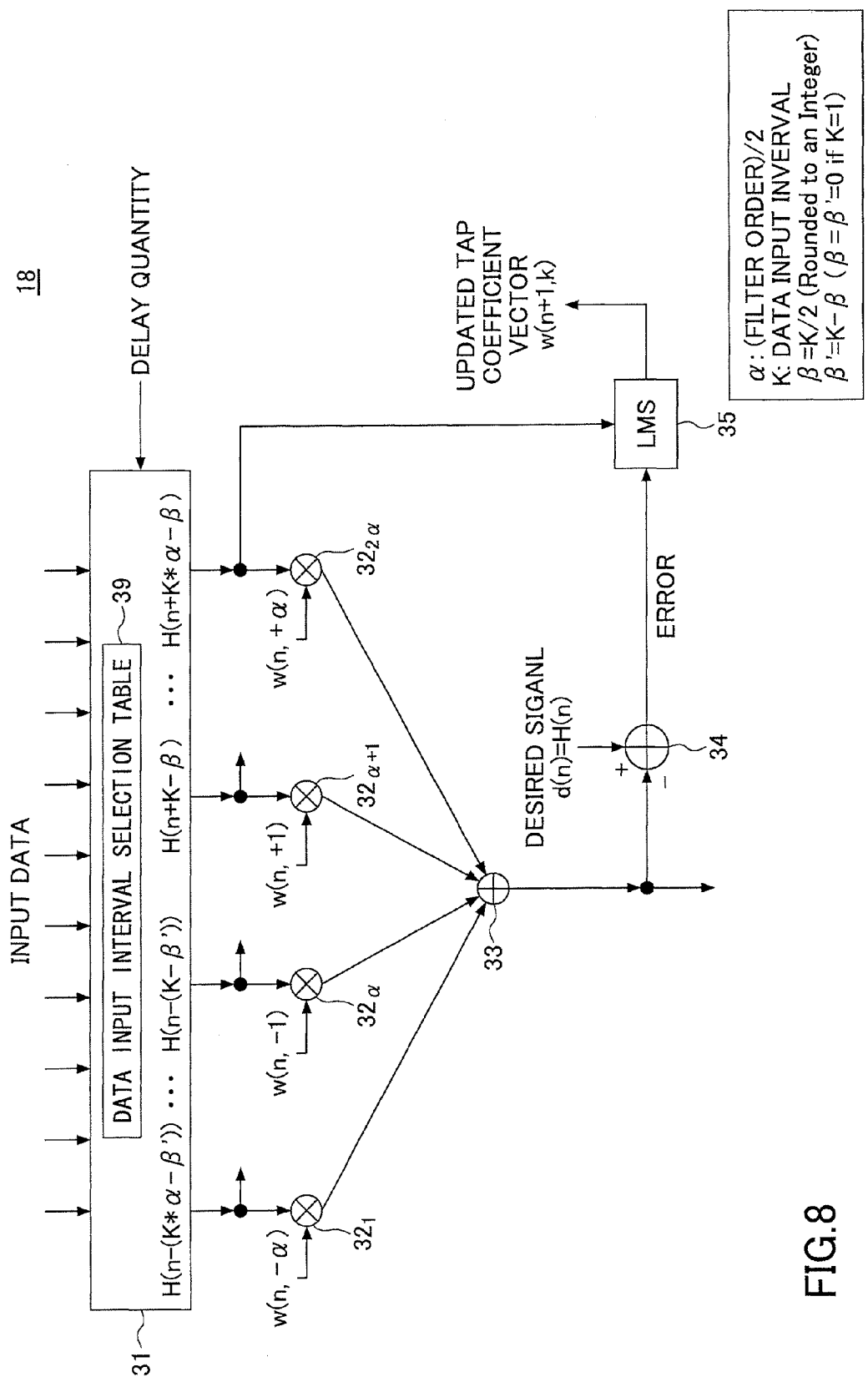
FIG. 8 illustrates a structure of an adaptive filter used in a data signal correction circuit according to an embodiment.

FIG. 8 is a schematic diagram of the adaptive filter 18. The adaptive filter 18 has a data input interval selector 31, multipliers $32_1$ to $32_{2\alpha}$, an adder 33, an adder 34, and a coefficient update processor unit 35. The data input interval selector 31 receives a delay quantity calculated by the path detector unit 17. The data input interval selector 31 has a data input interval selection table 39, and selects an appropriate data input interval (i.e., step size) according to the delay quantity supplied from the path detector unit 17.

FIG. 9 illustrates an example of the data input interval selection table 39. The data input interval selection table 39 describes a correspondence relationship between delay quantity, data input interval (step size) K, and cutoff frequency of the low pass filter of the subsequent stage.

Figure 10A:
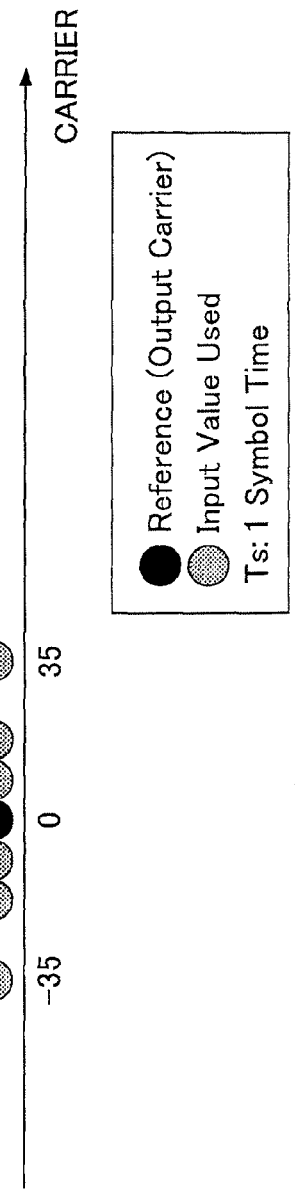
FIG. 10A illustrates an example of selection of input data to the adaptive filter when varying data input interval in the carrier direction.

For example, if the delay quantity "δ" is at or above one half (½) of a symbol time, the delay is significant and accordingly input data items are successively allocated as they are to the respective taps (step size K=1). The successive data input at step size "1" is illustrated in FIG. 10A. On the other hand, if a multipath delay quantity is small, influence on the adaptive equalization is small even if channel characteristic estimate values are thinned out to some extent in the carrier direction, and rather, the wide band filtering effect becomes significant.

Figure 10B:
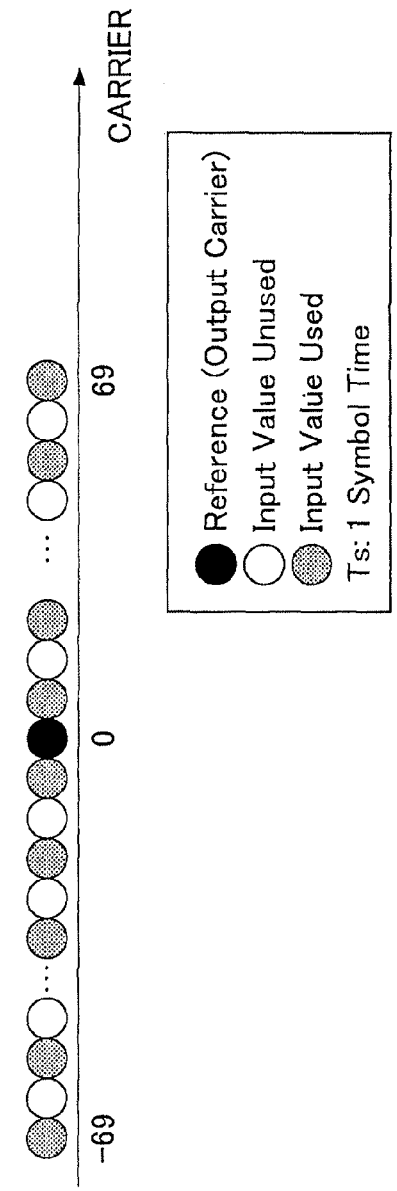
FIG. 10B illustrates an example of selection of input data to the adaptive filter when varying data input interval in the carrier direction.
Figure 10C:
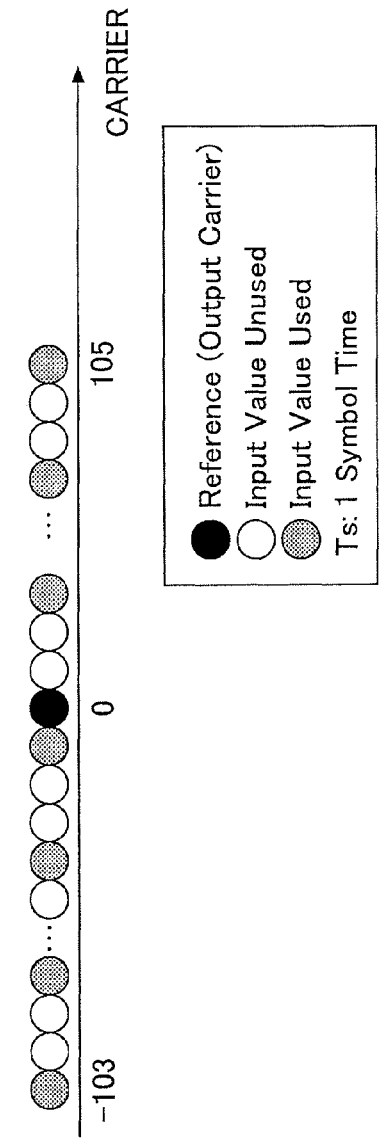
FIG. 10C illustrates an example of selection of input data to the adaptive filter when varying data input interval in the carrier direction.
Figure 10D:
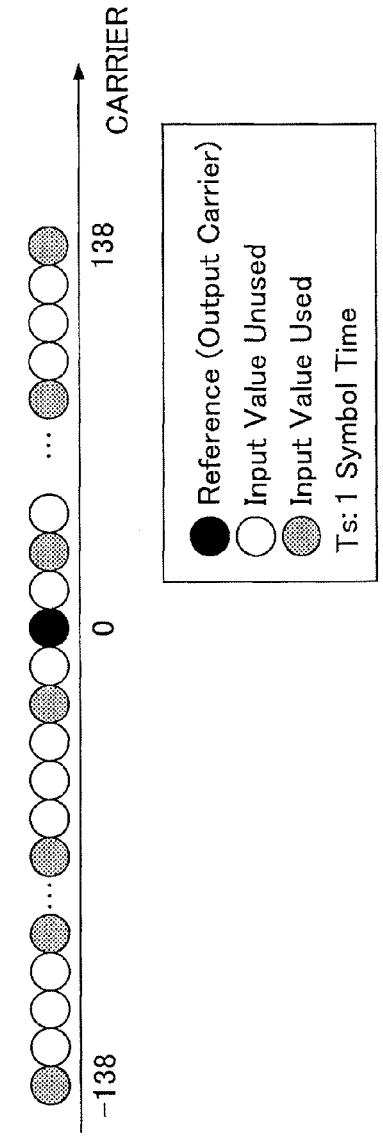
FIG. 10D illustrates an example of selection of input data to the adaptive filter when varying data input interval in the carrier direction.

When the delay quantity is at or above ⅓ of a symbol time and less than ½ of a symbol time, the data input interval K is set to 2 (K=2). In this case, data items (channel characteristic estimate values) are input to the adaptive filter 18 every other carrier, as illustrated in FIG. 10B. If the delay quantity is at or above ¼ of a symbol time and less than ⅓ of a symbol time, then the data input interval K is set to 3 (K=3) and data items are input to the adaptive filter 18 every three carriers, as illustrated in FIG. 10C. The process of FIG. 10C corresponds to the process illustrated in FIG. 7B. If the delay quantity is at or above ⅕ of a symbol time and less than ¼ of a symbol time, then the data input interval K is set to 4 (K=4) and data items are input to the adaptive filter 18 every four carriers, as illustrated in FIG. 10D. In this manner, the wide band effect as if the number of taps is increased can be achieved without changing the number of taps.

It is enough for the adaptive filter 18 to know the relationship between the delay quantity and the data input interval K. Accordingly, the data input interval selection table 39 may describe only the relationship between the delay quantity and the data input interval K, while the relationship between the delay quantity and the LPF cutoff frequency may be omitted.

Returning to FIG. 8, once the K value representing the data input interval or the step size is selected, the carrier numbers to be input to the taps are determined. Provided that the carrier number of the reference signal (desired signal) is n, that the filter order is 2×α, and that the data input interval is K, then the β value used in the right hand side of the center of the taps is K/2 (β=K/2) cutting off after the decimal point. The β' value used in the left hand side of the center of the taps is K−β. If K equals 1 (K=1) without thinning out, both β and β' are zero (β=β'=0).

If the estimate values are input every other carrier as illustrated in FIG. 10B, K is set to 2 (K=2), and β=2/2=1 and β'=2−1=1. Accordingly, the carrier numbers of the estimate values to be input to the adaptive filter 18 are H(n−(2α−1)), . . . , H(n−1), H(n+1), . . . , H(n+(2α−1)).

If the estimate values are input every three carriers as illustrated in FIG. 10C, K equals 3 (K=3), which is an odd number. In this case, β=3/2=1, β'=3−1=2. Accordingly, the carrier numbers of the estimate values input to the adaptive filter 18 are H(n−(3α−2)), . . . , H(n−1), H(n+1), . . . , H(n+(3α−1)).

Each of the multipliers $32_1$ to $32_{2\alpha}$ multiplies the channel characteristic estimate value of the inputted carrier number by a corresponding tap coefficient. All the multiplication results are added together at adder 33. The addition result becomes an output of the adaptive filter 18, which represents an adaptively equalized channel characteristic estimate value for the carrier number "n". The addition result of the adder 33 is also supplied to adder 34.

The adder 34 calculates a difference (an error) between the addition result and the desired signal d(n)=H(n) and supplies the error to the coefficient update processor unit 35. The coefficient update processor unit 35 also receives at its input terminals the pre-multiplication channel characteristic estimate values, and updates the tap coefficient vectors based upon the channel characteristic estimate values and the error using an arbitrary algorithm. In the example of FIG. 8, a least mean square (LMS) method is used to update the tap coefficients; however, any suitable algorithm may be used.

Figure 11:
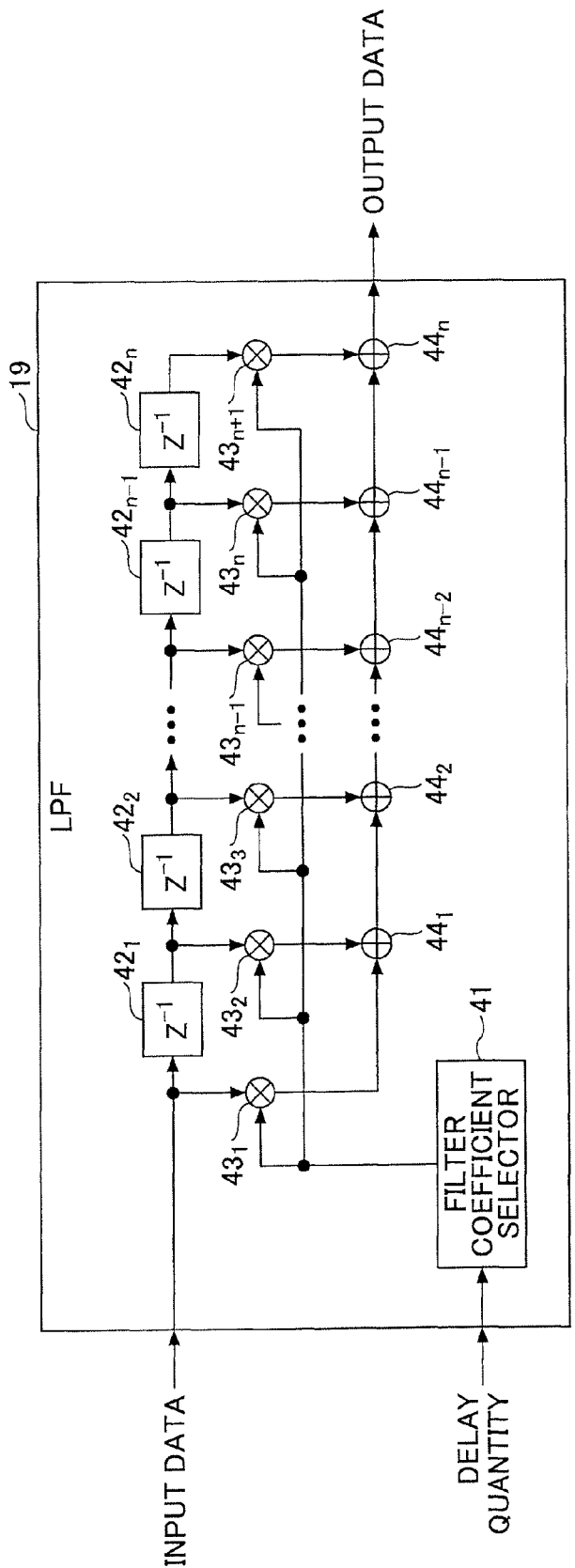
FIG. 11 illustrates a low pass filter used in a data signal correction circuit according to the embodiment.

FIG. 11 is a schematic diagram of the low pass filter 19 arranged after the adaptive filter 18. The low pass filter 19 has a filter coefficient selector unit 41, delay elements $42_1$ to $42_n$, multipliers $43_1$ to $43_{n+1}$, and adders $44_1$ to $44_n$.

The output of the adaptive filter 18 is connected to the input of the low pass filter 19. The filter coefficient selector unit 41 receives the delay quantity detected by the path detector unit 17 and selects a set of filter coefficients according to the delay quantity. The filter coefficient selector unit 41 has a table similar to the data input interval selection table 39 illustrated in FIG. 9. Alternatively, a part of the data input interval selection table 39 that describes the correspondence relationship between the delay quantity and the LPF cutoff frequency may be used in the filter coefficient selector unit 41. For instance, if the multipath delay quantity is at or above one half (½) of a symbol time, low pass filtering is not performed because the channel characteristic estimate values are input successively in the carrier direction without skipping.

If the data input interval has been broadened in the carrier direction with a small amount of multipath delay, a fold-back appears at a position (1 symbol)/(data input interval K) according to the sampling theorem. In this case, the filter coefficients of the low pass filter 19 are selected such that a frequency higher than 1/K of the symbol frequency is cut off.

When the delay quantity is at or above ⅓ of a symbol time and less than ½ of a symbol time, channel characteristic estimate values are input to the adaptive filter 18 every other carrier (K=2). In this case, the filter coefficients of the low pass filter 19 are selected so as to cut off a frequency higher than the ½ symbol frequency.

When the delay quantity is at or above ¼ of a symbol time and less than ⅓ of a symbol time, channel characteristic estimate values are input to the adaptive filter 18 every three carriers (K=3). In this case, the filter coefficients of the low pass filter 19 are selected so as to cut off a frequency higher than the ⅓ symbol frequency.

The input data item (that is, an adaptively equalized channel characteristic estimate value) is multiplied at the multiplier $43_1$ by the first filter coefficient selected by the filter coefficient selector unit 41. The input data item is delayed sequentially at the delay elements $42_1$ to $42_n$, and each of the delayed data items is multiplied by a filter coefficient at a corresponding one of the multipliers $42_2$ to $42_{n+1}$. The multiplication results are added cumulatively at the adders $44_1$ to $44_n$, and the cumulative value is output from the low pass filter

19. The output of the low pass filter 19 is connected to the input of the second data signal correction processor unit 20 (FIG. 5).

The second data signal correction processor unit 20 divides the received data signal by the channel characteristic estimate value output from the low pass filter 19 to estimate the transmitted data signal. The transmitted data signal calculated by the second data signal correction processor unit 20 becomes an output of the data signal correction circuit 4 and is supplied to the demodulator unit 5 (FIG. 4).

In the embodiment, the data signal correction circuit 4 broadens the data input interval (or the carrier interval) for adaptive equalization in accordance with the multipath delay quantity. With this arrangement, the channel estimation accuracy is improved without increasing the number of taps of the adaptive filter.

If in the above-described embodiment a receivable multipath delay quantity is limited to less than ⅓ of a symbol time, then the K value representing the data input interval may be fixed to 3 (K=3) and the number of taps may be reduced to a number that can achieve an adaptive equalization characteristic similar to the conventional technique. In this case, the conventional filter resolution can be maintained while reducing the circuit size.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A data signal correction circuit comprising:
a channel characteristic calculator unit configured to calculate a channel characteristic estimate value of a received data signal on the basis of a pilot signal;
a path detector unit configured to determine a delay quantity of multipath propagation of the received data signal on the basis of the calculated channel characteristic estimate value; and
an adaptive filter configured to receive the delay quantity and the channel characteristic estimate value as input items, adjust an input interval of the channel characteristic estimate value along a carrier frequency axis in accordance with the delay quantity such that the input interval set when the delay quantity is at a first level, is greater than the input interval set when the delay quantity is at a second level that is higher than the first level, and perform adaptive equalization on the channel characteristic estimate value inputted to the adaptive filter at the adjusted input interval.

2. A data signal correction circuit comprising:
a channel characteristic calculator unit configured to calculate a channel characteristic estimate value of a received data signal on the basis of a pilot signal;
a path detector unit configured to determine a delay quantity of multipath propagation of the received data signal on the basis of the calculated channel characteristic estimate value;
an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval; and
a low pass filter arranged after the adaptive filter,
wherein the low pass filter is configured to receive an output from the adaptive filter and the delay quantity as input items and vary a cutoff frequency in accordance with the delay quantity.

3. A data signal correction circuit comprising:
a channel characteristic calculator unit configured to calculate a channel characteristic estimate value of a received data signal on the basis of a pilot signal;
a path detector unit configured to determine a delay quantity of multipath propagation of the received data signal on the basis of the calculated channel characteristic estimate value; and
an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval,
wherein the adaptive filter includes a table that describes a correspondence relationship between the delay quantity and the input interval.

4. The data signal correction circuit according to claim 2, wherein the low pass filter includes a table that describes a correspondence relationship between the delay quantity and the cutoff frequency.

5. A data signal correction circuit comprising:
a channel characteristic calculator unit configured to calculate a channel characteristic estimate value of a received data signal on the basis of a pilot signal;
a path detector unit configured to determine a delay quantity of multipath propagation of the received data signal on the basis of the calculated channel characteristic estimate value; and
an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval,
wherein the adaptive filter does not vary the input interval when the delay quantity is at or above a third level, and wherein the adaptive filter inputs the channel characteristic estimate value every K carriers (where K is an integer equal to or greater than 2) when the delay quantity is below the third level.

6. The data signal correction circuit according to claim 2, wherein the low pass filter does not perform frequency cutoff when the delay quantity is at or above a fourth level, and wherein the low pass filter performs frequency cutoff at the selected cutoff frequency in accordance with the delay quantity when the delay quantity is below the fourth level.

7. A receiver comprising:
a signal receiver unit;
a data signal correction circuit configured to perform channel correction on a data signal received at the signal receiver unit, the data signal correction circuit including a channel characteristic calculator unit configured to calculate a channel characteristic estimate value of a received data signal on the basis of a pilot signal, a path detector unit configured to determine a delay quantity of multipath propagation of the received data signal on the basis of the calculated channel characteristic estimate value, and an adaptive filter configured to receive the delay quantity and the channel characteristic estimate value as input items, adjust an input interval of the channel characteristic estimate value along a carrier frequency axis in accordance with the delay quantity such that the input interval set when the delay quantity is at a first level, is greater than the input interval set when the delay quantity is at a second level that is higher than the first level, and perform adaptive equalization on the channel characteristic estimate value inputted to the adaptive filter at the adjusted input interval; and a modulator and decoder unit configured to modulate and decode the channel-corrected data signal to output at least one of a video signal and an audio signal.

8. A receiver comprising:

a signal receiver unit;

a data signal correction circuit configured to perform channel correction on a data signal received at the signal receiver unit, the data signal correction circuit including a channel characteristic calculator unit configured to calculate a channel characteristic estimate value of a received data signal on the basis of a pilot signal, a path detector unit configured to determine a delay quantity of multipath propagation of the received data signal on the basis of the calculated channel characteristic estimate value, and an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval; and a modulator and decoder unit configured to modulate and decode the channel-corrected data signal to output at least one of a video signal and an audio signal, wherein the data signal correction circuit further includes a low pass filter arranged after the adaptive filter, and wherein the low pass filter is configured to receive an output from the adaptive filter and the delay quantity as input items and vary a cutoff frequency in accordance with the delay quantity.

9. A receiver comprising:

a signal receiver unit;

a data signal correction circuit configured to perform channel correction on a data signal received at the signal receiver unit, the data signal correction circuit including a channel characteristic calculator unit configured to calculate a channel characteristic estimate value of a received data signal on the basis of a pilot signal, a path detector unit configured to determine a delay quantity of multipath propagation of the received data signal on the basis of the calculated channel characteristic estimate value, and an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval; and a modulator and decoder unit configured to modulate and decode the channel-corrected data signal to output at least one of a video signal and an audio signal, wherein the adaptive filter includes a table that describes a correspondence relationship between the delay quantity and the input interval.

10. The receiver according to claim 8, wherein the low pass filter includes a table that describes a correspondence relationship between the delay quantity and the cutoff frequency.

11. A receiver comprising:

a signal receiver unit;

a data signal correction circuit configured to perform channel correction on a data signal received at the signal receiver unit, the data signal correction circuit including a channel characteristic calculator unit configured to calculate a channel characteristic estimate value of a received data signal on the basis of a pilot signal, a path detector unit configured to determine a delay quantity of multipath propagation of the received data signal on the basis of the calculated channel characteristic estimate value, and an adaptive filter configured to receive the delay quantity and the channel characteristic estimate value as input items, adjust an input interval of the channel characteristic estimate value along a carrier frequency axis in accordance with the delay quantity, and perform adaptive equalization on the channel characteristic estimate value inputted to the adaptive filter at the adjusted input interval; and a modulator and decoder unit configured to modulate and decode the channel-corrected data signal to output at least one of a video signal and an audio signal, wherein the adaptive filter does not vary the input interval when the delay quantity is at or above a third level, and wherein the adaptive filter inputs the channel characteristic estimate value every K carriers (where K is an integer equal to or greater than 2) when the delay quantity is below the third level.

12. The receiver according to claim 8, wherein the low pass filter does not perform frequency cutoff when the delay quantity is at or above a fourth level, and wherein the low pass filter performs frequency cutoff at the selected cutoff frequency in accordance with the delay quantity when the delay quantity is below the fourth level.

13. A data signal correction method comprising:

calculating, at a receiver, a channel characteristic estimate value of a received data signal on the basis of a pilot signal;

determining a delay quantity of multipath propagation of the received data signal on the basis of the calculated channel characteristic estimate value; and performing adaptive equalization on the calculated channel characteristic estimate value by adjusting an input interval of the channel characteristic estimate value along a carrier frequency axis in accordance with the delay quantity such that the input interval set when the delay quantity is at a first level, is greater than the input interval set when the delay quantity is at a second level that is higher than the first level.

14. A data signal correction method comprising:

calculating, at a receiver, a channel characteristic estimate value of a received data signal on the basis of a pilot signal;

determining a delay quantity of multipath propagation of the received data signal on the basis of the calculated channel characteristic estimate value;

performing adaptive equalization on the calculated channel characteristic estimate value by adjusting an input interval of the channel characteristic estimate value along a carrier frequency axis in accordance with the delay quantity;

selecting a cutoff frequency in accordance with the delay quantity; and filtering the adaptively-equalized channel characteristic estimate value at the selected cutoff frequency.

15. A data signal correction method comprising:

calculating, at a receiver, a channel characteristic estimate value of a received data signal on the basis of a pilot signal;

determining a delay quantity of multipath propagation of the received data signal on the basis of the calculated channel characteristic estimate value;

performing adaptive equalization on the calculated channel characteristic estimate value by adjusting an input interval of the channel characteristic estimate value along a carrier frequency axis in accordance with the delay quantity; and storing a correspondence relationship between the delay quantity and the input interval in a memory prior to the performing adaptive equalization.

16. The data signal correction method according to claim 14, further comprising:

storing a correspondence relationship between the delay quantity and the cutoff frequency in a memory prior to the performing adaptive equalization.

17. A data signal correction method comprising:

calculating, at a receiver, a channel characteristic estimate value of a received data signal on the basis of a pilot signal;

determining a delay quantity of multipath propagation of the received data signal on the basis of the calculated channel characteristic estimate value; and performing adaptive equalization on the calculated channel characteristic estimate value by adjusting an input interval of the channel characteristic estimate value along a carrier frequency axis in accordance with the delay quantity, wherein the input interval is not varied when the delay quantity is at or above a third level, and wherein the channel characteristic estimate value is varied every K carriers (where K is an integer equal to or greater than 2) when the delay quantity is below the third level.

18. The data signal correction method according to claim 14, wherein frequency cutoff is not performed for the filtering when the delay quantity is at or above a fourth level, and wherein frequency cut off is performed at the selected cutoff frequency in accordance with the delay quantity when the delay quantity is below the fourth level.

\* \* \* \* \*